United States Patent
Stahr et al.

(10) Patent No.: US 9,630,608 B2
(45) Date of Patent: Apr. 25, 2017

(54) HYDRAULIC COMPONENT, IN PARTICULAR OF A HYDRAULIC BRAKING SYSTEM

(71) Applicant: Robert Bosch GmbH, Stuttgart (DE)

(72) Inventors: Wolf Stahr, Abstatt (DE); Daniel Brenndoerfer, Ludwigsburg (DE); Michael Eisenlauer, Affalterbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/404,967

(22) PCT Filed: Apr. 4, 2013

(86) PCT No.: PCT/EP2013/057093
§ 371 (c)(1),
(2) Date: Dec. 2, 2014

(87) PCT Pub. No.: WO2013/182334
PCT Pub. Date: Dec. 12, 2013

(65) Prior Publication Data
US 2015/0158478 A1    Jun. 11, 2015

(30) Foreign Application Priority Data

Jun. 4, 2012   (DE) ........................ 10 2012 209 400

(51) Int. Cl.
*B60T 17/00* (2006.01)
*B60T 17/04* (2006.01)
(Continued)

(52) U.S. Cl.
CPC .............. *B60T 17/04* (2013.01); *B60T 8/368* (2013.01); *B60T 8/4068* (2013.01); *F16L 55/02718* (2013.01); *F16L 55/02736* (2013.01)

(58) Field of Classification Search
CPC ........ B60T 8/26; B60T 8/4872; B60T 8/4086; B60T 8/3615; B60T 8/5037; B60T 17/04; B60T 13/686
(Continued)

(56) References Cited

U.S. PATENT DOCUMENTS 2,946,416 A * 7/1960 Snoy ........................ F16D 33/16
180/53.1
3,486,801 A * 12/1969 Frayer ................... B60T 8/3615
137/625.62
(Continued)

FOREIGN PATENT DOCUMENTS

CH         226516          7/1943
DE    41 18 949 A1      12/1992
(Continued)

OTHER PUBLICATIONS

International Search Report corresponding to PCT Application No. PCT/EP2013/057093, mailed Jun. 25, 2013 (German and English language document) (7 pages).

*Primary Examiner* — Christopher Schwartz
(74) *Attorney, Agent, or Firm* — Maginot, Moore & Beck LLP

(57) ABSTRACT

A hydraulic component, in particular of a hydraulic braking system, includes a conduit section through which brake fluid flows. The conduit section has at least one reflection surface that is impinged by the brake fluid.

11 Claims, 3 Drawing Sheets

(51) Int. Cl.
*B60T 8/36* (2006.01)
*B60T 8/40* (2006.01)
*F16L 55/027* (2006.01)

(58) Field of Classification Search
USPC .......................................................... 303/87
See application file for complete search history.

(56) References Cited

U.S. PATENT DOCUMENTS

| | | | | |
|---|---|---|---|---|
| 4,989,924 | A * | 2/1991 | Toda | B60T 8/4068 137/565.33 |
| 5,074,625 | A * | 12/1991 | Jones | B60T 8/42 138/30 |
| 5,205,309 | A * | 4/1993 | Cardenas | B60T 8/32 137/1 |
| 5,417,481 | A | 5/1995 | Megerle et al. | |
| 5,472,266 | A * | 12/1995 | Volz | B60T 8/5037 303/115.4 |
| 7,240,696 | B2 * | 7/2007 | Schlitzkus | B60T 17/00 138/26 |
| 8,881,771 | B2 * | 11/2014 | Lee | B60T 17/04 138/30 |
| 2010/0072408 | A1 * | 3/2010 | Olson | F15B 13/06 251/129.15 |

FOREIGN PATENT DOCUMENTS

| | | |
|---|---|---|
| DE | 42 13 524 A1 | 10/1993 |
| DE | 43 43 678 A1 | 6/1995 |
| DE | 197 32 771 A1 | 2/1999 |
| DE | 103 05 310 A1 | 8/2004 |
| JP | S58-8455 A | 1/1983 |
| JP | 2003-237557 A | 8/2003 |
| JP | 2008-56204 A | 3/2008 |
| NO | 55970 C | 12/1935 |

* cited by examiner

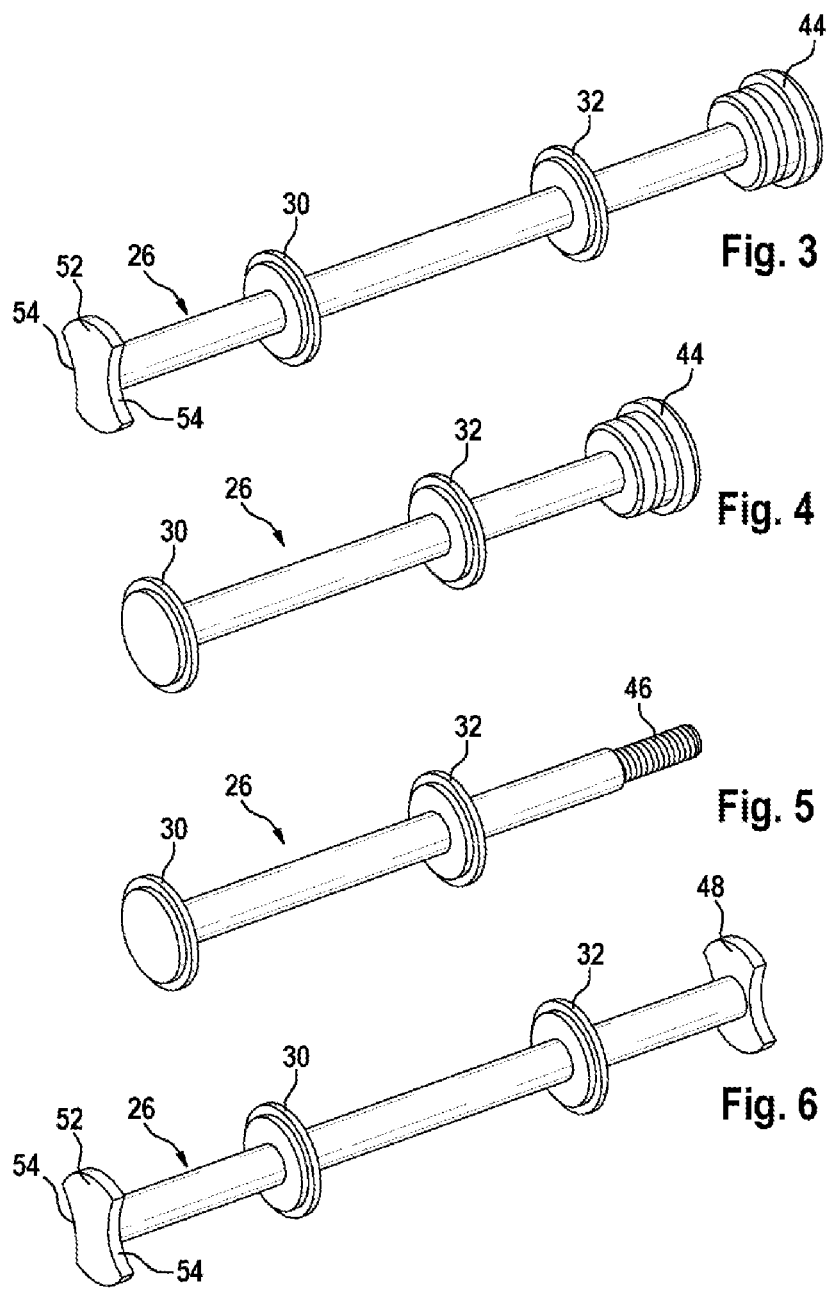

HYDRAULIC COMPONENT, IN PARTICULAR OF A HYDRAULIC BRAKING SYSTEM

This application is a 35 U.S.C. §371 National Stage Application of PCT/EP2013/057093, filed on Apr. 4, 2013, which claims the benefit of priority to Serial No. DE 10 2012 209 400.8, filed on Jun. 4, 2012 in Germany, the disclosures of which are incorporated herein by reference in their entirety.

BACKGROUND

The disclosure relates to a hydraulic component, in particular a hydraulic brake system, with a line segment through which brake fluid flows.

With motor vehicles, such as e.g. automobiles or trucks, hydraulic units are used in order to provide regulated brake pressures to the brake system. In particular, functions of an anti-lock brake system (ABS), a traction control system (TCS) and/or of an electronic stability program (ESP) are implemented with such hydraulic units. For metering of the brake pressure the hydraulic units comprise at least one pump with a plurality of pump pistons or pump elements and a plurality of valves. The valves are generally controlled electromagnetically, whereby different brake pressures can be provided in individual brake circuits at very short notice. Attenuators are used with such hydraulic brake systems in order to prevent pressure pulsations and the accompanying noise. The pressure pulsations arise with the compression of the brake fluid by means of the pump elements in the hydraulic unit itself and in the rest of the brake system. Furthermore, attenuators should in particular prevent noise caused by pressure waves resulting from sudden pressure rises when switching the valves.

A pressure pulsation attenuator for a hydraulic brake system is e.g. known from DE 103 05 310 B4. A piston pump of a hydraulic unit of a brake system is known from DE 197 32 771 A1, with which its cylinder bore on the side of a displacement chamber is closed by means of a membrane for building up pressure peaks as a result of the discontinuous supply of the piston pump. The membrane is a deep drawn component of sheet metal that can be elastically deformed by flowing brake fluid. The elastic deformability damps pressure changes in the associated discharge chamber.

The object of the disclosure is to provide a hydraulic component, in particular a hydraulic unit of a brake system, with which a high degree of attenuation of pressure pulsations and pressure peaks is achieved in a particularly inexpensive manner.

SUMMARY

According to the disclosure, a hydraulic component is provided, in particular a hydraulic brake system, with a line segment through which brake fluid is to flow, in which at least one first reflection surface onto which brake fluid flows is disposed. With the solution according to the disclosure, oscillations, pressure waves and malfunctions or noise resulting therefrom are attenuated or eliminated by at least one reflection surface, which is specifically inserted in a line segment of an associated hydraulic component. The reflection surface causes a reflection of pressure waves and provides that pressure pulsations are cancelled by the respective reflected pressure wave by means of destructive interference. In particular, the space between two opposing reflection surfaces forms a so-called lambda/4 attenuator. The length of the space is a quarter of the wavelength of the pressure wave to be attenuated in this case. With said attenuators the phase position of a part of the pressure wave is rotated by 180°. With the at least one reflection surface according to the disclosure, interferences are thus formed that counteract a disturbance by pressure waves.

With an advantageous development of the solution according to the disclosure, at least one second reflection surface is provided, which extends parallel to the first reflection surface. The two parallel reflection surfaces form a reflection space, whereby interferences occur at two opposing side walls. Moreover, further provided reflection surfaces can be set at predetermined distances from the first reflection surface, whereby different reflection points in time and thus different frequency ranges of respective interferences occur for approaching pressure waves. This enables frequency ranges that would lead to an increase in resonance in the brake system to be selectively controlled.

The line segment according to the disclosure used preferably has a longitudinal extent and the at least one first reflection surface is oriented transversely to the longitudinal extent of the line segment. The reflection surface is thus oriented transversely to the main direction of flow of the fluid flowing through the line segment and thus provides a strong pulse reflection for said fluid.

Furthermore, the line segment advantageously has a lateral extent and the at least one first reflection surface only extends over a partial region of the lateral extent of the line segment. With said type of reflection surface there also remains sufficient cross-sectional area via which brake fluid can flow through the line segment. The open cross-sectional area is preferably dimensioned in relation to the desired flow resistance of the flowing fluid with respect to the desired reflection.

Particularly preferably, the at least one first reflection surface is disposed in its centre when viewed in the lateral direction of the line segment. Said type of reflection surface results in an essentially symmetrical distribution of the interference thus produced within the line segment. Furthermore, in this way the geometry of the resulting attenuator is defined such that it can also be reproduced e.g. by means of simulation.

The at least one first reflection surface and preferably also the at least one second reflection surface are preferably formed on an insert part disposed in the line segment. Such an insert part can be manufactured separately from the hydraulic component in accordance with the desired interference with high production accuracy. Furthermore, the insert part can be adapted very well to the boundary conditions and in particular the pulsation behavior of the remainder of the brake system. The insert part is preferably disposed on a cover that closes the end of the line segment or is formed in one piece or integrally with said cover. This enables the insert part to be easily disposed in the cover, especially in a stationary and permanently stable manner, when inserting and fixing the cover on the line segment.

The insert part is advantageously formed with a central rod, on which are disposed the at least one first reflection surface and preferably also the at least one second reflection surface, being oriented transversely to the longitudinal extent of the line segment. The rod is advantageously to be disposed in the centre of the line segment and provides a support on which a plurality of reflection surfaces can be disposed, in particular in succession, in parallel and at predetermined intervals.

The insert part is also preferably formed with a disk inserted in a fixed position in the line segment, on which the at least one first reflection surface is disposed and oriented transversely to the longitudinal extent of the line segment. The disk also forms defined reflection surfaces transverse to the flow direction of the fluid flowing through the line segment and can thereby be provided in the line segment in a simple and inexpensive manner.

The disk is particularly preferably provided with at least one through opening, in particular in the centre of the disk. The disk is thereby preferably fixed in the line segment with an outer mounting, fixed as a single part in the line segment or formed as a geometric element in the line segment. The through opening frees the cross-sectional area that is desired for the throughflow of the brake fluid. In order to achieve a point symmetrical form of the interference in the line segment in relation to the cross-sectional area, it is advantageous to provide the through opening in the centre of the line segment.

Particularly preferably, two disks are inserted in the line segment in fixed positions at a defined distance apart from each other. With such disks the above-mentioned advantages of parallel reflection surfaces that are disposed one behind the other in the line segment are achieved in a particularly inexpensive and material-saving manner.

BRIEF DESCRIPTION OF THE DRAWINGS

An exemplary embodiment of the solution according to the disclosure is explained in detail below using the accompanying schematic figures. In the figures:

FIG. 3 shows a perspective view of the insert part according to FIG. 2, FIG. 4 shows a perspective view of a second exemplary embodiment of an insert part, FIG. 5 shows a perspective view of a third exemplary embodiment of an insert part, FIG. 6 shows a perspective view of a fourth exemplary embodiment of an insert part.

DETAILED DESCRIPTION

Figure 1:
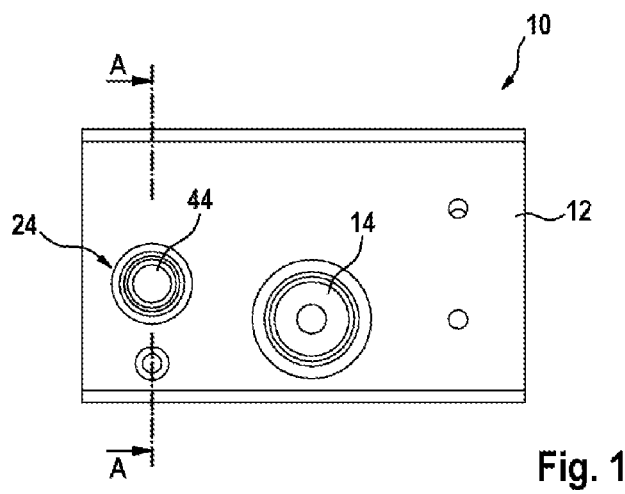
FIG. 1 shows a lateral view of a hydraulic component in the form of a hydraulic unit of a brake system according to the disclosure.

In FIG. 1 a hydraulic component 10 in the form of a hydraulic unit is illustrated, its hydraulic block 12 being made of aluminum. Eight bores are formed in the hydraulic block 12, of which a blind bore 14 is used to accept a pump element that is not illustrated further. Another blind bore acts as a connecting line 16 for connecting three lines 18, 20 and 22 running transversely thereto in the form of blind bores. The three lines 18, 20 and 22 open further into another blind bore, which extends parallel to the connecting line 16 and forms a line segment 24.

A valve that is not illustrated is disposed in each of the lines 18, 20 and 22 with the hydraulic unit 10 already mounted. The lines 18, 20 and 22 form flow lines for the hydraulic unit 10 through which brake fluid can be transported, especially to the brakes (not illustrated) of the associated brake system. For this purpose, there is a discharge line 23 on the bottom of the line segment 24 in the form of a blind bore.

In the line segment 24 an insert part 26 is disposed that extends with a central rod 28 in the longitudinal direction of the line segment 24. Two disks 30 and 32 are disposed on the rod 28 transversely to the longitudinal direction and at predefined distances from the lines 18, 20 and 22. The disks 30 and 32 are each circular and their diameters are dimensioned such that they extend almost but not completely over the lateral extent of the line segment 24. They are held stationary in the centre of the line segment 24 by the rod 28.

Figure 8:
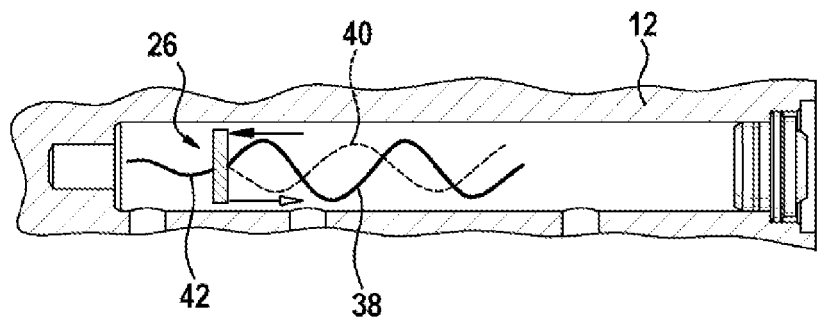

Each of the disks 30 and 32 is provided with a first reflection surface 34 or a second reflection surface 36 on its side facing the lines 20 or 22, the reflection surfaces passing in an annular manner around the rod 28 at the end of the disks. The disks 30 and 32 thereby divide the line segment 24 into chambers, each of which is delimited at its ends by the reflection surfaces 34 or 36. As is illustrated in FIG. 8, a reflection wave 40 occurs at such reflection surfaces 34 or 36 with the approach of an incident pressure wave 38. These two waves, the pressure wave 38 and the reflection wave 40, result in a reduction of the resulting amplitude of the wave of the brake fluid flowing past the reflection surface 34 because of destructive interference. Thus the brake fluid only flows with an attenuated resultant pressure wave 42 after the resonant surface 34, resulting in low noise and low loading of the downstream brake system. In particular, a reflection at a reflection surface 34 at a distance of a quarter of the wavelength of the associated pressure wave substantially extinguishes said pressure wave. This also applies to pressure waves with an integral multiple of the frequency of said pressure wave.

Figure 2:
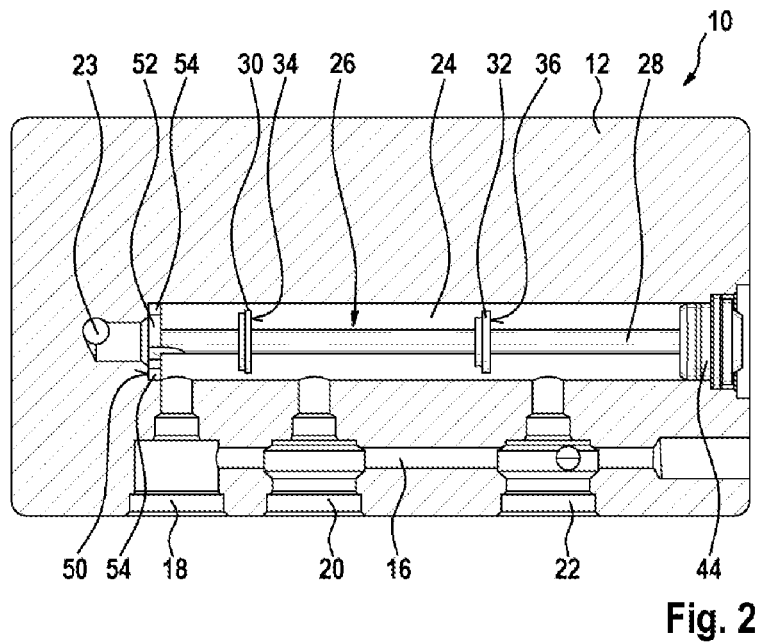
FIG. 2 shows the section A-A in FIG. 1 with a first exemplary embodiment of an insert part with reflection surfaces disposed in the hydraulic unit.

The line segment 24 in the form of a blind bore is externally closed by a stopper type cover 44, which is inserted into the hydraulic block 12 and fixed therein stationary and fluid tight by means of a caulking. The rod 28 is formed in one piece with the cover 44 in the exemplary embodiments according to FIGS. 2, 3 and 4. With the exemplary embodiment according to FIG. 5, the rod 28 is screwed to the cover 44 by means of a threaded segment 46 on its end face.

With the exemplary embodiment according to FIG. 6 the rod 28 is provided with a transversely extending supporting surface 48 on its end face facing the cover 44, with which it contacts the cover 44 and can be supported thereon in the inserted state.

The line segment 24 is of stepped form and comprises a recess that forms an axially oriented support surface 50 for a second transversely oriented end supporting surface 52 of the central rod 28 of the insert part 26 according to FIGS. 3 and 6. Two radially outer, diametrically opposed notches 54, through which the brake fluid can flow axially, are formed on the second end supporting surface 52.

Figure 7:
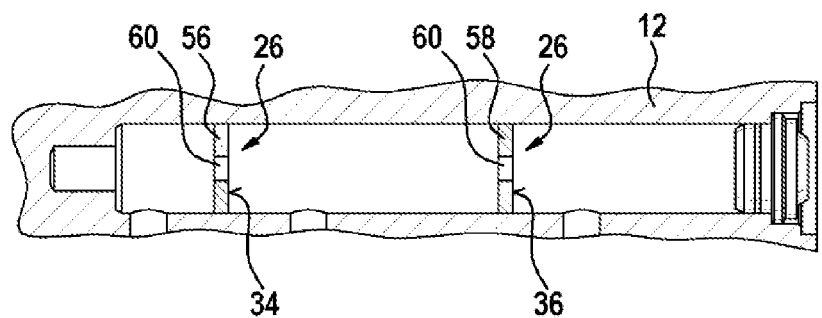
FIG. 7 shows the section A-A according to FIG. 2 with a fifth exemplary embodiment of insert parts disposed in the hydraulic unit and FIG. 8 shows the section A-A according to FIG. 2 with an illustration of the operation of an insert part with a reflection surface according to the disclosure.

An exemplary embodiment of a hydraulic block 12 with a line segment 24 is illustrated in FIG. 7, in which the insert part 26 is formed by two disks 56 or 58. The two disks 56 and 58 have been pressed into the line segment 24, being transversely oriented at predefined distances relative to each other and relative to the axial arrangements of the lines 18, and 22. They are fixedly disposed in the line segment 24 because of the resultant pressure forces on their outer edge. A through opening 60 is formed in the centre of each of the two disks 56 or 58, via which the brake fluid can flow through the disks 56 or 58. Annular reflection surfaces 34 or 36 thus result on each of the disks 56 or 58.

The invention claimed is:

1. A hydraulic component, comprising:
   a line segment through which brake fluid flows, the line segment having a longitudinal extent and an inner circumference; and
   a disk having at least one first reflection surface, the disk immovable in any direction in the line segment, the disk positioned in the line segment such that the brake fluid flows onto the first reflection surface, the disk having a continuous circular circumference that is not in contact with the inner circumference of the line segment, and the at least one first reflection surface oriented transversely to the longitudinal extent of the line segment.

2. The hydraulic component as claimed in claim 1, further comprising at least one second reflection surface disposed in the line segment and configured such that the brake fluid flows onto the second reflection surface, the at least one second reflection surface extending parallel to the at least one first reflection surface.

3. The hydraulic component as claimed in claim 2, further comprising a second disk disposed in the line segment at a fixed position with respect to the line segment such that the second disk is positioned at a predefined distance from the disk.

4. The hydraulic component as claimed in claim 3, wherein the at least one second reflection surface is formed on the second disk.

5. The hydraulic component as claimed in claim 4, further comprising an insert part formed with a central rod on which the at least one first reflection surface and the at least one second reflection surface are disposed transversely to the longitudinal extent of the line segment.

6. The hydraulic component as claimed in claim 1, wherein the at least one first reflection surface is formed on an insert part disposed in the line segment.

7. The hydraulic component as claimed in claim 6, wherein the insert part includes a central rod on which the at least one first reflection surface is disposed transversely to a longitudinal extent of the line segment.

8. The hydraulic component as claimed in claim 6, wherein the insert part includes the disk disposed in the line segment such that the at least one first reflection surface is oriented transversely to a longitudinal extent of the line segment.

9. The hydraulic component as claimed in claim 1, wherein the line segment has a lateral extent and the at least one first reflection surface extends only over a partial region of the lateral extent of the line segment.

10. The hydraulic component as claimed in claim 1, wherein the at least one first reflection surface is disposed at a center of the line segment when viewed in a lateral direction of the line segment.

11. The hydraulic component as claimed in claim 1, wherein the hydraulic component is configured for a hydraulic brake system.

* * * * *